US006581960B1

United States Patent

(12) United States Patent
Schondorf et al.

(10) Patent No.: US 6,581,960 B1
(45) Date of Patent: Jun. 24, 2003

(54) SEAT BELT OCCUPANT SENSOR

(75) Inventors: Steven Yellin Schondorf, Dearborn, MI (US); Markus Hagen, Cologne (DE); Ralf Brosig, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/460,825

(22) Filed: Dec. 14, 1999

(51) Int. Cl.[7] ........ B60R 21/32

(52) U.S. Cl. ........ 280/735; 280/801.1; 180/273

(58) Field of Search ........ 280/728.1, 735, 280/801.1, 803, 807; 180/271, 273

(56) References Cited

U.S. PATENT DOCUMENTS 3,133,277 A * 5/1964 Hood ........ 280/735 X
3,934,671 A * 1/1976 Hart ........ 280/735 X
4,015,236 A 3/1977 Boudeville
4,189,022 A * 2/1980 Lazich et al. ........ 280/801 X
4,511,097 A 4/1985 Tsuge et al.
4,572,543 A * 2/1986 Tsuge et al. ........ 280/807 X
4,659,108 A 4/1987 Sack et al.
4,667,336 A * 5/1987 Best ........ 280/801 X
4,758,020 A * 7/1988 Boyd ........ 280/801
4,885,566 A 12/1989 Aoki et al.
5,181,739 A 1/1993 Bauer et al.
5,454,591 A 10/1995 Mazur et al.
5,553,804 A 9/1996 Hamann
5,558,370 A 9/1996 Behr
5,571,253 A * 11/1996 Blackburn et al. ...... 280/807 X
5,626,359 A * 5/1997 Steffens et al. ........ 280/735
5,670,853 A * 9/1997 Bauer ........ 180/273
5,724,024 A 3/1998 Sonderegger et al.
5,831,342 A 11/1998 Vivacqua et al.
5,865,463 A * 2/1999 Gagnon et al. ........ 280/735
5,871,232 A * 2/1999 White ........ 280/735
5,873,599 A 2/1999 Bauer et al.
6,020,812 A * 2/2000 Thompson et al. ........ 180/273
6,104,308 A * 8/2000 Wallace et al. ........ 280/735 X
6,142,524 A * 11/2000 Brown et al. ........ 280/801.1 X

FOREIGN PATENT DOCUMENTS

JP 63305057 12/1988

* cited by examiner

*Primary Examiner*—Paul N. Dickson
*Assistant Examiner*—Toan To
(74) *Attorney, Agent, or Firm*—David B. Kelly

(57) ABSTRACT

An occupant sensor system 12 is coupled to an airbag deployment system 14. Occupant sensor system 12 has an occupant sensor 24 that comprises a seat belt and a plurality of wires extending a predetermined length within seat belt 26. Wires 28 are coupled to a controller 22 that is used to sense a changing electrical characteristic of wires 28 such as capacitance or inductance to determine the presence of an occupant. Controller 22 in response to the signal from occupant sensor 24 may then adjust the deployment of an airbag 18.

23 Claims, 2 Drawing Sheets

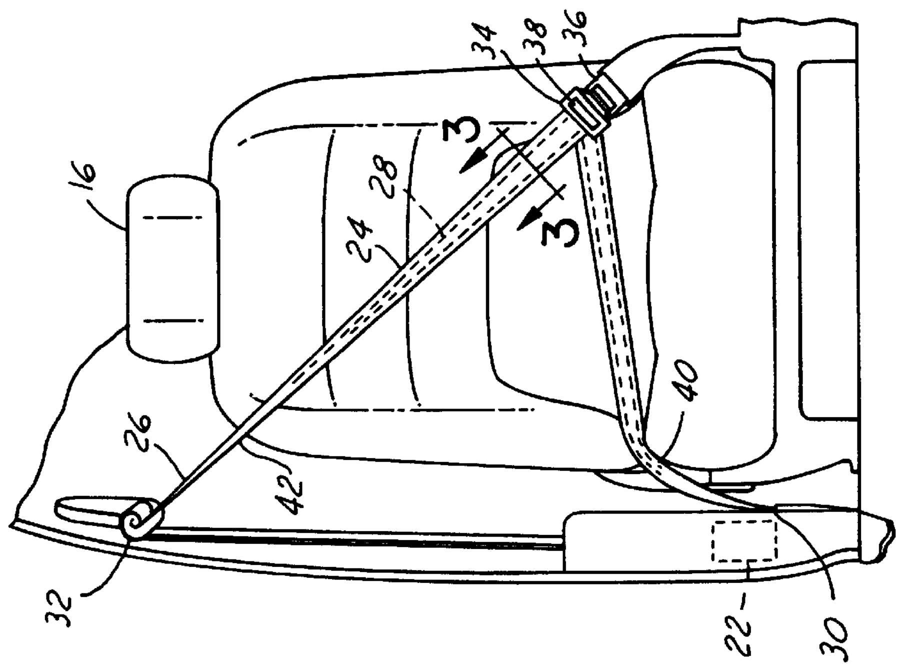
FIG. 2
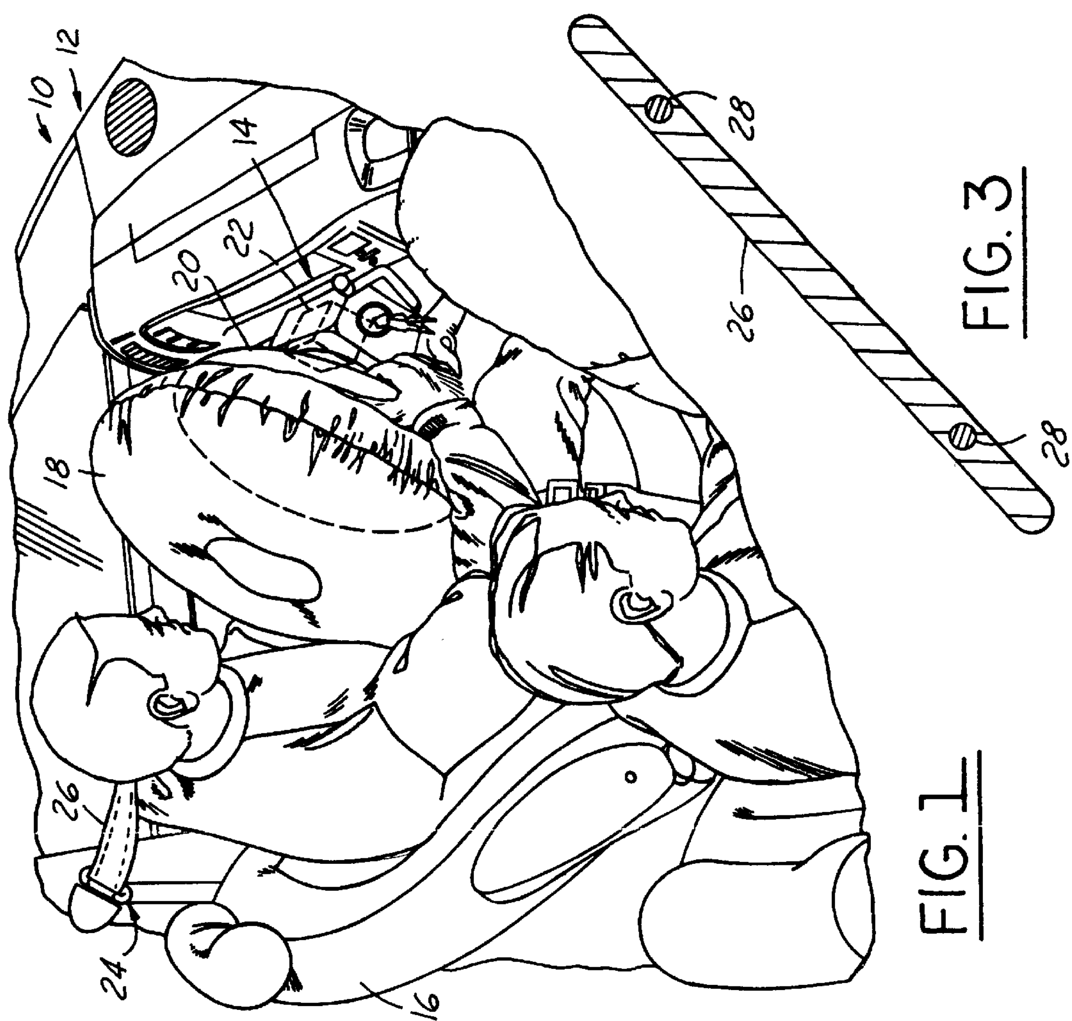
FIG. 3
FIG. 1

SEAT BELT OCCUPANT SENSOR

TECHNICAL FIELD

The present invention relates generally to a sensor for determining the presence of an occupant within an automotive vehicle and more specifically, to an occupant sensor incorporated within the seat belt that may be used to control the deployment of an airbag.

BACKGROUND

In the first iteration of airbags for automotive vehicles, the airbags deployed upon sensing a predetermined deceleration of the vehicle. The airbags deployed at a predefined rate without regard to other input.

More recently, airbags have been developed that deploy at a lesser rate than early airbags. These airbags, however, also do not take into consideration other factors. For example, both a passenger side and driver side airbag deploy simultaneously without regard to whether a passenger is present.

Various methods for determining the presence of an occupant have been proposed. These sensors include infrared sensors directed to the passenger area, weight sensors that are located under the seat, and seat belt use sensors that measure the radius of the webbing spooled upon the retractor. The radius of the webbing may be determined by a mechanical type sensor that measures the thickness of the web around the spool. The drawback to retractor systems is that because the designs are mechanical, the moving parts must be assembly, It would be therefore be desirable to provide a sensing system for detecting the presence of a seat occupant, which addresses these concerns.

SUMMARY OF THE INVENTION

It is therefore one object of the invention to provide an occupant sensing system that accurately and reliably measures the presence of an occupant in a seating position. It is a further object of the invention to adjust the deployment of an airbag in response to the occupant sensor.

In one aspect of the invention, an occupant sensor includes a seatbelt and a plurality of wires extending a predetermined length of the seat belt that conforms to the shape of the seat belt. A controller is coupled to the plurality of wires and measures a change in the electrical characteristics of the wire and indicates the presence of an occupant in response to the electrical characteristic.

In a further aspect of the invention, the occupant sensor is coupled to an airbag controller. The airbag controller adjusts the airbag deployment strategy in response to the electrical characteristic.

In a further aspect of the invention, a method for determining the presence of an occupant within an automotive vehicle comprises the steps of:

passing an electrical signal through wires within a length of a seat belt, said wires have a shape;

measuring a seat belt electrical characteristic of said wires;

comparing the seat belt electrical characteristic to a known characteristic; and indicating the presence of a occupant in response to the step of comparing.

One advantage of the invention is that not only may the presence of an occupant be detected, but the size of the occupant may also be detected.

Another advantage of the sensor is that it may be incorporated into the seat belt without significant expense and operates electrically without moving mechanical parts.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 1 is a perspective view of an automotive vehicle having an occupant sensor and airbag deployment system according to the present invention.

FIG. 2 is an elevational view of an airbag deployment system according to the present invention.

FIG. 3 is a cross-sectional view of a seat belt according to the present invention.

DETAILED DESCRIPTION OF THE PREFERRED EMBODIMENT

Figure 4:
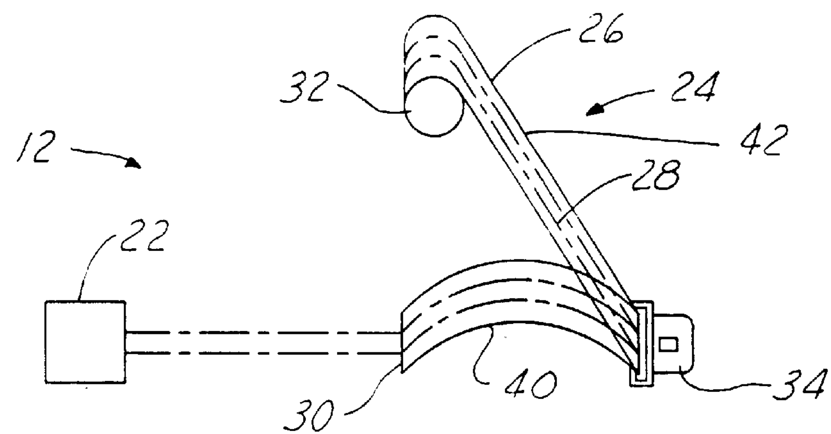
FIG. 4 is a perspective view of a seat belt with occupant sensor coupled to an airbag module.

In the following figures, the same reference numerals will be used to identify identical components in the various views. The present invention is illustrated with respect to a single occupant sensor with respect to a single seat within the automotive vehicle. However, the present invention may be employed with respect to the passenger, driver and a middle occupant of the front seats of the vehicle. The present invention is also equally applicable to occupant sensing in rear seating positions of the vehicle. Also, the system is illustrated with respect to a one retractor system mounted to the vehicle. Those skilled in the art would recognize that the present invention is suitable for other types of systems that are seat mounted or my have more retractors.

Referring now to FIG. 1, a perspective view of a portion of an automotive vehicle 10 having an occupant sensor system 12 and an airbag deployment system 14 is illustrated. Automotive vehicle 10 has a seat 16 positioned adjacent to an airbag 18. If seat 16 is a driver seat, airbag 18 may be included within a steering wheel 20. An airbag controller 22 is coupled to airbag 18 to control the deployment of the airbag 18.

Occupant sensor system 12 has an occupant sensor 24 positioned within seatbelt 26 and the airbag controller 22. Occupant sensor 24 is coupled to airbag controller 22 and indicates to the airbag controller 22 the presence of an occupant. Of course, a separate occupant sensor controller may be employed.

Referring now to FIG. 2, controller 22 is shown coupled to occupant sensor 24 within seat belt 26. Occupant sensor 24 comprises a plurality of wires 28 extending a predetermined length of seat belt 26. The length of occupant sensor 24 may extend the entire length of seat belt 26 or only a portion thereof. Of course, one skilled in the art would recognize that the length of occupant sensor 24 may vary depending on the desired needs of the particular system, the sensitivity of the system and the design of the automotive vehicle. As illustrated, the wires are parallel, however various shapes such as meandering or criss-cross or comb-shaped may be employed. A suitable shape based on the particular design can be easily determined by one skilled in the art.

Seat belt 26 is mounted within automotive vehicle 10 at an anchor 30 and at a retractor 32. Both anchor 30 and retractor 32 are fixedly coupled to structure within automotive vehicle 10. Anchor 30 is a fixed anchor point whereas retractor 30 may be used to remove excess play in seat belt 26. Retractor 32 holds excess seat belt 26 when not in use.

Seat belt 26 has a buckle 34 positioned thereon. Buckle 34 may be slid with respect to the length of seat belt 26 to adjust around an occupant. A buckle receiver 36 is fixedly mounted to the structure of automotive vehicle 10 and buckle 34. A buckle sensor 38 may be coupled to controller 22 to provide an indication as to whether buckle 34 has been placed within buckle receiver 36. Buckle sensor 38 may be a mechanical, electrical or magnetic position sensor. Although optional, buckle sensor 38 is used to provide additional information to controller and is an optional feature. Prior to positioning seat belt 26 around an occupant, the seat belt 26 is positioned between anchor 30 and retractor 32 with excess seat belt 26 wrapped around retractor 32. In such a position, buckle 34 is positioned between anchor 30 and retractor 32. When an occupant enters the vehicle, the seat belt 26 with occupant sensor 24 is extended around the occupant so that buckle 34 may be placed within buckle receiver 36. Thus, when seat belt 26 is installed, seat belt 26 forms a lap portion 40 and a shoulder portion 42.

Referring now to FIG. 3, seat belt 26 is shown having wires 28 positioned therebetween. Wires 28 may also be positioned on the outside of seat belt 26. Commonly, seat belts are formed of cloth webbing. Wires 28 may also be woven within the webbing of seat belt 26.

Referring now to FIG. 4, occupant sensor system 12 is illustrated in a position representing partially around an occupant. As shown, occupant sensor 24 within seat belt 26 with wires 28 contained therein is extended from retractor 32. Seat belt 26 between buckle 34 and anchor 30 has a curvature as opposed to the straight unretracted position. Seat belt 26 between buckle 34 and retractor may also have various irregular shapes such as various radius curves. The shape of seat belt causes the wires 28 to have different electrical characteristics when electrical signals are passed therethrough.

Occupant sensor 24 receives an electrical signal from controller 22. Controller 22 monitors the electrical characteristics of occupant sensor 24. By monitoring the change of electrical characteristics of occupant sensor 24, the controller 22 senses when an occupant is present. The size of the occupant may also be determined. The electrical characteristics that may be monitored by controller 22 include but are not limited to capacitance or inductance.

Figure 5:
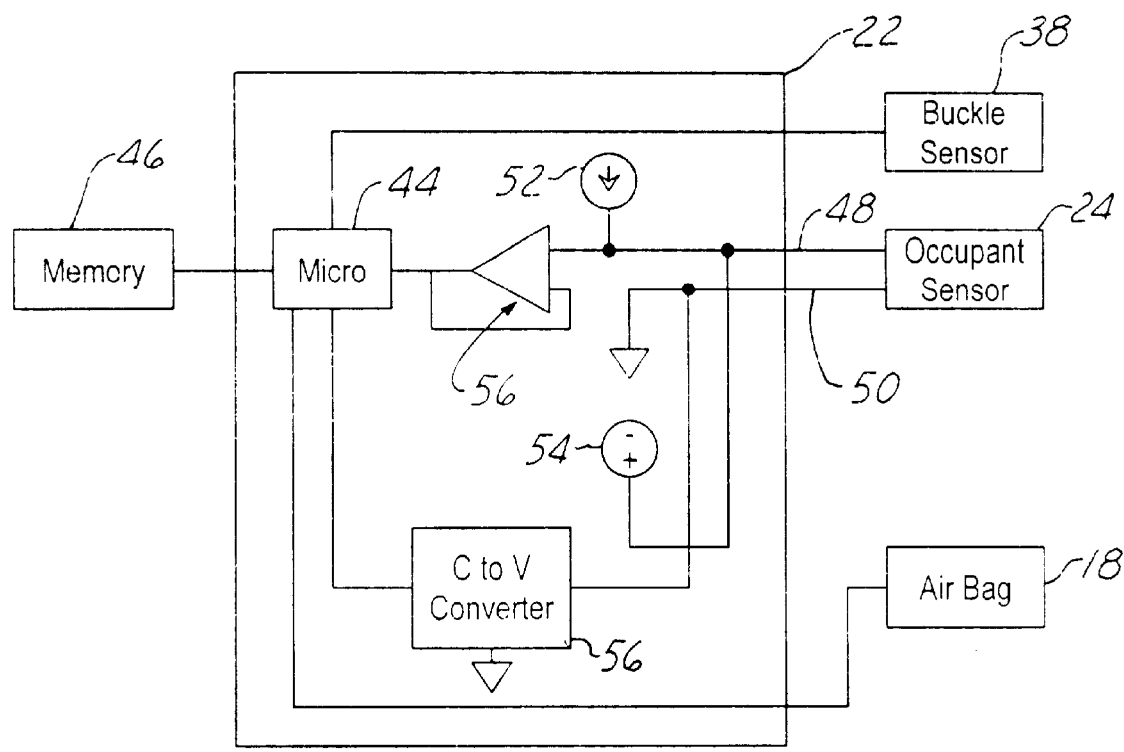
FIG. 5 is a schematic view of an airbag module according to the present invention.

Referring now to FIG. 5, controller 22 has a microprocessor 44 contained therein. Microprocessor 44 based on various inputs, controls the deployment of airbag 18. Microprocessor 44 has a memory 46 coupled thereto. As illustrated, memory 46 is positioned outside controller 22. However, memory 46 may be included within controller 22 and may be an integral part of microprocessor 44. Memory 46 is preferably a non-volatile memory such as an EEPROM. Memory 46, as will be further described below, may be used to store a lookup table that has electrical characteristic values and corresponding occupant values.

Occupant sensor 24 is controlled and monitored by microprocessor 44. Occupant sensor 24 has an input 48 and an output 50. Input 48 has a constant current source 52 or a constant voltage source 54 coupled thereto. Input 48 and output 50 correspond to wires 28 shown above. A high impedence voltage follower 56 is coupled between input 48 and microprocessor 44. Because occupant sensor 24 has a low resistance, high impedance voltage follower 56 allows microprocessor 44 to control the application of voltage or current to occupant sensor 24 without an unduly large current drain therefrom. Microprocessors are typically low operating current devices.

Microprocessor 44 may provide a variety of signals to occupant sensor 24. For example, a square wave, a pulsed input, or a constant voltage or current may be applied to occupant sensor 24. Microprocessor 44 may also not constantly monitor occupant sensor 24. For example, buckle sensor 38 may be used as input to initiate microprocessor 44 to control occupant sensor 24. That is, upon the insertion of buckle 34 within buckle receiver 36, buckle sensor 38 provides a buckle signal to microprocessor 44 in response thereto. Microprocessor 44 initiates the application of a predetermined signal to occupant sensor 24.

Output 50 may be coupled to a current-to-voltage converter 56. Current-to-voltage converter 56 is coupled to an input of microprocessor 44. Current-to-voltage converter 56 changes the current from occupant sensor 50 into a voltage 56 suitable for input to microprocessor 44. If, however, microprocessor 44 is capable of receiving a current, current-to-voltage converter 56 may be eliminated.

In operation, an occupant within the vehicle sits in seat 16 and extends seat belt 26. Buckle 34 is placed into a buckle receiver 36. Buckle sensor 38 provides a signal to microprocessor 44. Buckle sensor 38 is an optional feature of the present invention. If the buckle sensor 38 is not used, the microprocessor may constantly monitor sensor 24 after the ignition switch of the vehicle is on.

The shape including curvature of the occupant sensor 24 and wires 28 therein provide a changing electrical characteristic. Microprocessor 44 initiates the application of an electrical signal to occupant sensor 24. Microprocessor 44 receives a signal that corresponds to the electrical characteristic to be measured. Microprocessor 44 compares the received signal from occupant sensor 24 and compares it to predetermined values. The predetermined values may be stored in memory 46. Various ranges of the electrical characteristics will correspond with an occupant wearing seat belt 26. Microprocessor 44 thus indicates the presence or absence of an occupant based upon the comparison. Further, because the electrical characteristics may vary based on the curvature of wires 28, the size of the occupant may also be determined.

Microprocessor 44 in response to the signal from occupant sensor 24 may control the deployment of airbag 18. For example, if occupant sensor 24 indicates no occupant is present, the airbag may not be deployed. Further, if a signal indicating a small occupant 24 is present, the airbag deployment rate may be reduced. Those skilled in the art would recognize that various airbag deployment strategies may be employed in response to occupant sensor 24.

While particular embodiments of the invention have been shown and described, numerous variations and alternate embodiments will occur to those skilled in the art. Accordingly, it is intended that the invention be limited only in terms of the appended claims.

What is claimed is:

1. An occupant sensor comprising:

a seat belt;

a plurality of wires extending a predetermined length of said seat belt and conforming to a shape of said seat belt; and a controller coupled to said plurality of wires measuring a change in an electrical characteristic of the wire and indicating the presence of an occupant in response to said electrical characteristic corresponding to a change in a shape of said wires.

2. An occupant sensor as recited in claim 1 wherein said electrical characteristics comprises inductance.

3. An occupant sensor as recited in claim 1 wherein said electrical characteristics comprises capacitance.

4. An airbag system comprising an occupant sensor as recited in claim 1 wherein said controller comprises an airbag controller.

5. An occupant sensor as recited in claim 1 wherein said wires extend within said seat belt.

6. An airbag deployment system for an automotive vehicle comprising:

an airbag;

a seat belt;

an occupant sensor having wires extending a predetermined length of said seat belt and conforming to a shape of said seat belt; and an airbag controller module coupled to said sensor, said controller measuring a change in an electrical characteristic of the wire and indicating the presence of an occupant in response to said electrical characteristic corresponding to a change in a shape of said wires.

7. An airbag deployment system as recited in claim 6 further comprising a memory coupled to said airbag controller.

8. An airbag deployment system as recited in claim 6 wherein said airbag controller comprises a constant current source coupled to said occupant sensor.

9. An airbag deployment system as recited in claim 6 wherein said airbag controller comprises a constant voltage source coupled to said occupant sensor.

10. An airbag deployment system as recited in claim 6 wherein said airbag controller comprises a current to voltage converter coupled to said occupant sensor.

11. An airbag deployment system as recited in claim 6 further comprising a buckle sensor coupled to the airbag controller indicating a buckled seatbelt.

12. An airbag deployment system as recited in claim 6 wherein said electrical characteristics comprises inductance.

13. An airbag deployment system as recited in claim 6 wherein said electrical characteristics comprises capacitance.

14. An airbag deployment system as recited in claim 6 wherein said wires extend within said seat belt.

15. A method of determining the presence of an occupant within an automotive vehicle comprising the steps of:

passing an electrical signal through wires within a length of a seat belt, said wires have a shape;

measuring a seat belt electrical characteristic of said wires corresponding to the shape of said wires;

comparing the seat belt electrical characteristic to a known characteristic; and indicating the presence of an occupant in response to the step of comparing.

16. A method of operating an airbag system comprising the steps of determining the presence of an occupant as recited in claim 15 and adjusting an airbag deployment strategy in response to step of comparing.

17. A method as recited in claim 15 further comprising the step of determining the seat belt buckle status.

18. A method as recited in claim 15 wherein the step of applying an electrical signal comprises applying a square wave through wires.

19. A method as recited in claim 15 wherein the step of measuring an electrical characteristic comprises measuring a capacitance of said wires.

20. A method as recited in claim 15 wherein the step of measuring an electrical characteristic comprises measuring a inductance of said wires.

21. An occupant sensor comprising:

a seat belt;

a plurality of wires extending a predetermined length of said seat belt and conforming to a shape of said seat belt; and a controller coupled to said plurality of wires measuring a change in an electrical characteristic of the wire and indicating the presence and size of an occupant in response to said electrical characteristic corresponding to a change in a shape of said wires.

22. An airbag deployment system for an automotive vehicle comprising:

an airbag;

a seat belt;

an occupant sensor having wires extending a predetermined length of said seat belt and conforming to a shape of said seat belt; and an airbag controller module coupled to said sensor, said controller measuring a change in an electrical characteristic of the wire and indicating the presence and size of an occupant in response to said electrical characteristic corresponding to a change in a shape of said wires.

23. A method of determining the presence of an occupant within an automotive vehicle comprising the steps of:

passing an electrical signal through wires within a length of a seat belt, said wires have a shape;

measuring a seat belt electrical characteristic of said wires corresponding to the shape of said wires;

comparing the seat belt electrical characteristic to a known characteristic; and indicating the presence and size of an occupant in response to the step of comparing.

* * * * *